(12) United States Patent
Minamino et al.

(10) Patent No.: US 10,972,811 B2
(45) Date of Patent: Apr. 6, 2021

(54) IMAGE PROCESSING DEVICE AND IMAGE PROCESSING METHOD

(71) Applicant: SONY CORPORATION, Tokyo (JP)

(72) Inventors: Takanori Minamino, Kanagawa (JP); Kou Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 274 days.

(21) Appl. No.: 15/426,105

(22) Filed: Feb. 7, 2017

(65) Prior Publication Data

US 2017/0150237 A1 May 25, 2017

Related U.S. Application Data

(63) Continuation of application No. 13/325,208, filed on Dec. 14, 2011, now Pat. No. 9,596,523.

(30) Foreign Application Priority Data

Dec. 27, 2010 (JP) .............................. JP2010-290445

(51) Int. Cl.
*H04N 21/85* (2011.01)
*H04N 21/8549* (2011.01)
*G11B 27/034* (2006.01)
*G11B 27/34* (2006.01)
*H04N 21/2743* (2011.01)
*H04N 21/4223* (2011.01)

(52) U.S. Cl.
CPC ....... *H04N 21/8549* (2013.01); *G11B 27/034* (2013.01); *G11B 27/34* (2013.01); *H04N 21/2743* (2013.01); *H04N 21/4223* (2013.01)

(58) Field of Classification Search
CPC .......................... H04N 21/8549; G11B 27/034
See application file for complete search history.

(56) References Cited

U.S. PATENT DOCUMENTS

| 2003/0177503 | A1* | 9/2003 | Sull ...................... G06T 3/4092 725/112 |
| 2005/0246752 | A1 | 11/2005 | Liwerant et al. |
| 2007/0044015 | A1 | 2/2007 | Ikeda |
| 2007/0120986 | A1 | 5/2007 | Nunomaki |
| 2008/0019610 | A1* | 1/2008 | Matsuzaka ......... G06K 9/00711 382/284 |
| 2008/0215984 | A1 | 9/2008 | Manico et al. |
| 2008/0276269 | A1 | 11/2008 | Miller et al. |
| 2009/0047000 | A1 | 2/2009 | Walikis et al. |

(Continued)

FOREIGN PATENT DOCUMENTS

| JP | 2005-236527 A | 9/2005 |
| JP | 2007-134770 A | 5/2007 |

(Continued)

OTHER PUBLICATIONS

Office Action for JP Patent Application No. 2010-290445, dated Jan. 27, 2015.

*Primary Examiner* — Girumsew Wendmagegn
(74) *Attorney, Agent, or Firm* — Chip Law Group

(57) ABSTRACT

An image processing device that includes a highlight extracted video creation unit that creates a highlight extracted video based on extraction of a highlight from each video file of a plurality of video files and a highlight extracted video storage unit that stores the highlight extracted video as one data file.

8 Claims, 6 Drawing Sheets

(56) References Cited

U.S. PATENT DOCUMENTS

| | | | |
|---|---|---|---|
| 2009/0132924 A1* | 5/2009 | Vasa | G11B 27/105 |
| | | | 715/723 |
| 2009/0265607 A1 | 10/2009 | Raz et al. | |
| 2011/0087666 A1 | 4/2011 | Chou et al. | |
| 2011/0158605 A1* | 6/2011 | Bliss | H04N 21/8405 |
| | | | 386/241 |

FOREIGN PATENT DOCUMENTS

| | | |
|---|---|---|
| JP | 2008-022103 A | 1/2008 |
| JP | 2008-112495 A | 5/2008 |
| JP | 2009-141524 A | 6/2009 |
| JP | 2010-016729 A | 1/2010 |

* cited by examiner

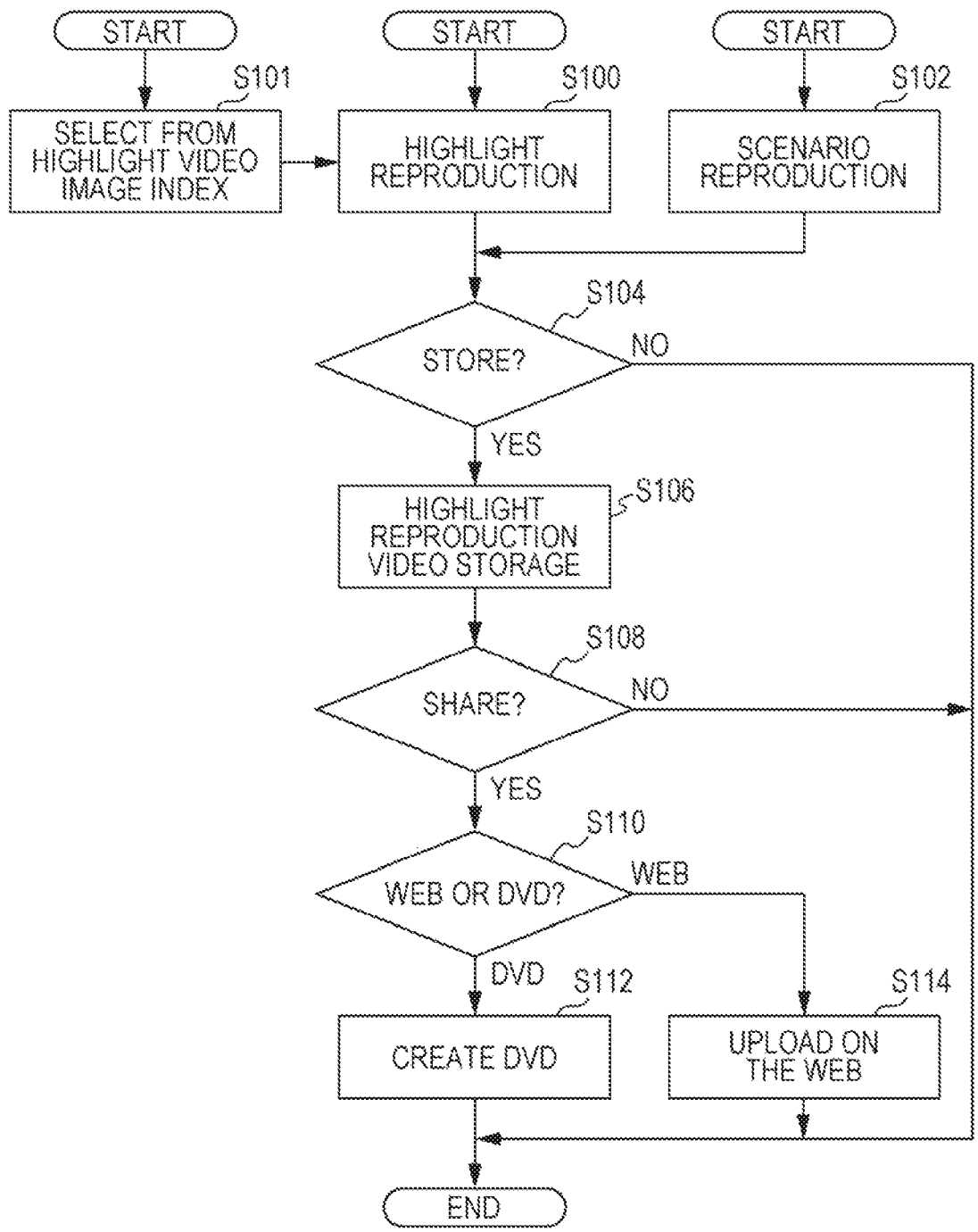

IMAGE PROCESSING DEVICE AND IMAGE PROCESSING METHOD

CROSS REFERENCE TO RELATED APPLICATIONS

The present application is a continuation application of U.S. patent application Ser. No. 13/325,208, filed Dec. 14, 2011, which claims the benefit of Japanese Priority Patent Application 2010-290445 filed Dec. 27, 2010. Each of the above-referenced applications is hereby incorporated herein by reference in its entirety.

BACKGROUND

The present disclosure relates to an image processing device, an image processing method, and a program.

In the past, in Japanese Unexamined Patent Application Publication No. 2007-134770, for example, there is a description regarding a technique to determine an important scene in parallel with a process of filming a video image and to generate important scene identification information to record it.

SUMMARY

However, with the technique described in Japanese Unexamined Patent Application Publication No. 2007-134770, after determining an important scene, a user was not able to create a file including the important scene.

It is desirable to provide an image processing device, an image processing method, and a program that are new and improved and also are capable of extracting a highlight video from a plurality of video files and sharing it among a plurality of users.

According to an embodiment of the present disclosure, there is provided an image processing device, including: a highlight extracted video creation unit creating a highlight extracted video, by obtaining a plurality of video files, obtained by extracting a highlight of each video file; and a highlight extracted video storage unit storing the highlight extracted video as one data file.

The image processing device may also further include a highlight extracted video file output unit outputting the data file.

In order to upload the data file via a network, the highlight extracted video file output unit may also output the data file to a device capable of being connected to the network.

In order to upload the data file via a network, the highlight extracted video file output unit may also output the data file. In order to record the data file in a disk form recording medium, the highlight extracted video file output unit may also output the highlight video to a recording unit of the disk form recording medium.

The image processing device may also further include: a scenario creation unit creating a scenario of the highlight extracted video; and a scenario storage unit storing the scenario.

The image processing device may also further include an index creation unit creating an index of the data file created in past. The highlight extracted video file output unit may output a data file specified by a user from the index among the data file created in the past.

The image processing device may also further include a highlight extracted video reproduction unit reproducing the highlight extracted video.

According to another embodiment of the present disclosure, there is provided an image processing method, including: creating a highlight extracted video, by obtaining a plurality of video files, obtained by extracting a highlight of each video file; and storing the highlight extracted video as one data file.

According to still another embodiment of the present disclosure, there is provided a program causing a computer to execute a process including: creating a highlight extracted video, by obtaining a plurality of video files, obtained by extracting a highlight of each video file; and storing the highlight extracted video as one data file.

According to an embodiment of the present disclosure, it is possible to provide an image processing device, an image processing method, and a program that are capable of extracting a highlight video from a plurality of video files and sharing it among a plurality of users.

BRIEF DESCRIPTION OF THE DRAWINGS

FIG. 6 is a flowchart showing a process procedure by the imaging device.

DETAILED DESCRIPTION OF EMBODIMENTS

Figure 1:
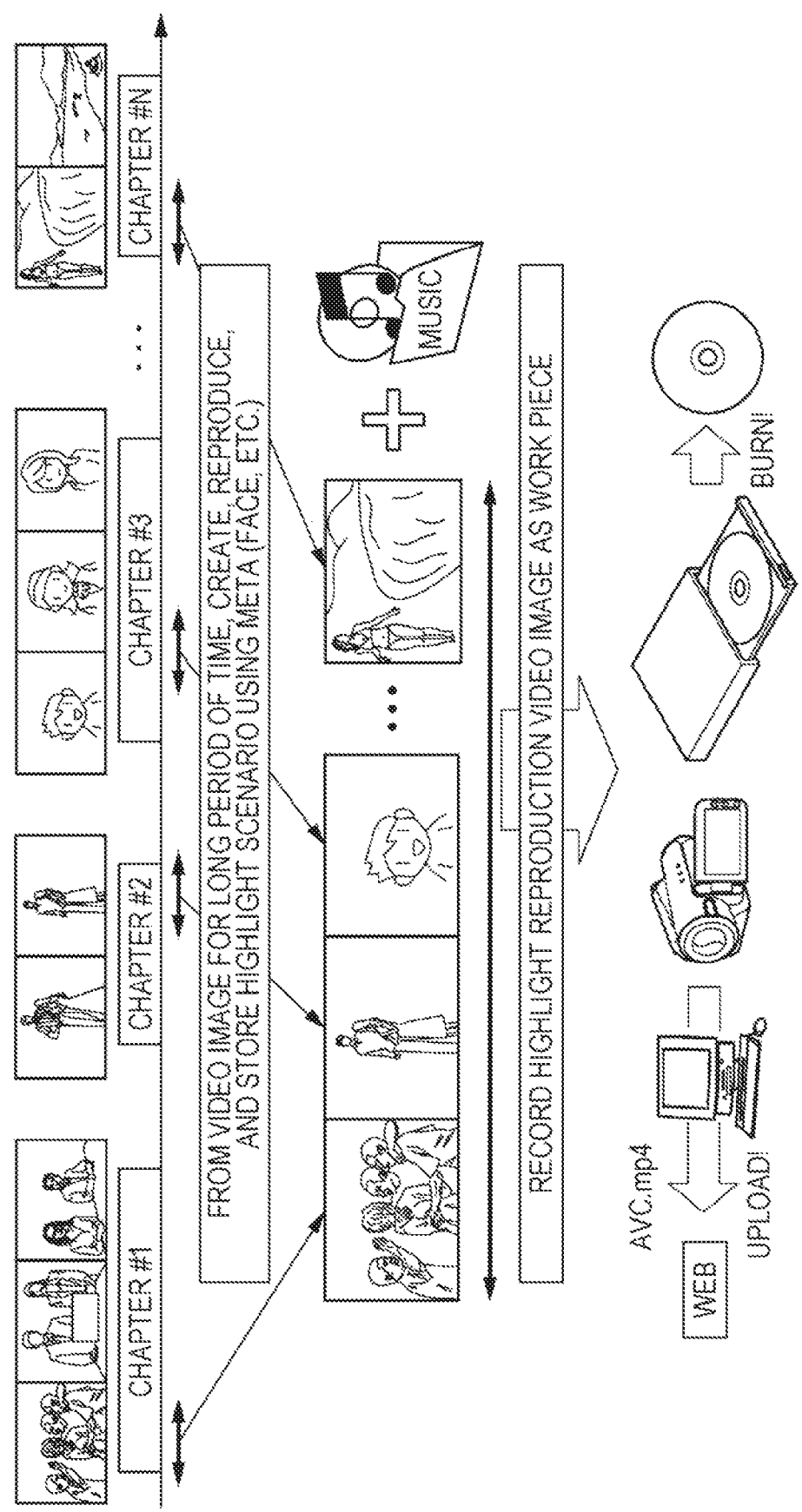
FIG. 1 is a block diagram illustrating an outline of processing in an imaging device according to an embodiment of the present disclosure.

A detailed description is given below to a preferred embodiment of the present disclosure with reference to the attached drawings. In the present specification and the drawings, a repetitive description is omitted by assigning an identical reference numeral to components having a substantially identical functional configuration. The description is given in the following order.

1. Outline of an Embodiment
2. Configuration Example of Imaging Device
3. Specific Processing in Imaging Device
4. Process Flow by Imaging Device

1. Outline of an Embodiment

Firstly, based on FIG. 1, a description is given to an outline of processing in an imaging device 100 according to an embodiment of the present disclosure. Although a description is given with an example of the imaging device 100 having an imaging function as an image processing device in the embodiment, the image processing device is not limited to this and the image processing device may also be various devices, such as a personal computer and a mobile phone. FIG. 1 is a block diagram illustrating an outline of processing in the imaging device 100.

The imaging device 100 according to the embodiment is, as one example, a device such as a video camera. The imaging device 100, as shown in FIG. 1, records a plurality of filmed video data items (video files). In FIG. 1, a chapter #1, a chapter #2, a chapter #3, . . . , a chapter #N illustrate a plurality of video files, respectively. The video files are not limited to video images and may also be still images.

As shown in FIG. 1, the imaging device 100 can create a highlight video in which major scenes are collected from each of the plurality of video files for reproduction. The imaging device 100 can record the created highlight video. As shown in FIG. 1, a highlight video is extracted from each video of the chapter #1, the chapter #2, the chapter #3, . . . , the chapter #N and can be reproduced as a highlight extracted video. From the highlight extracted video composed of the plurality of highlight videos, one video file (hereinafter, referred to as a highlight video extracted file) is created.

The highlight video extracted file thus created can be uploaded on the web in response to an instruction of a user. The highlight video extracted file can also be recorded in a recording medium, such as a DVD, in response to an instruction of a user. In such a manner, one highlight video extracted file in which a plurality of highlight videos is collected is created and stored, thereby enabling a user to view a highlight video only from a large number of video files.

2. Configuration Example of Imaging Device

Figure 2:
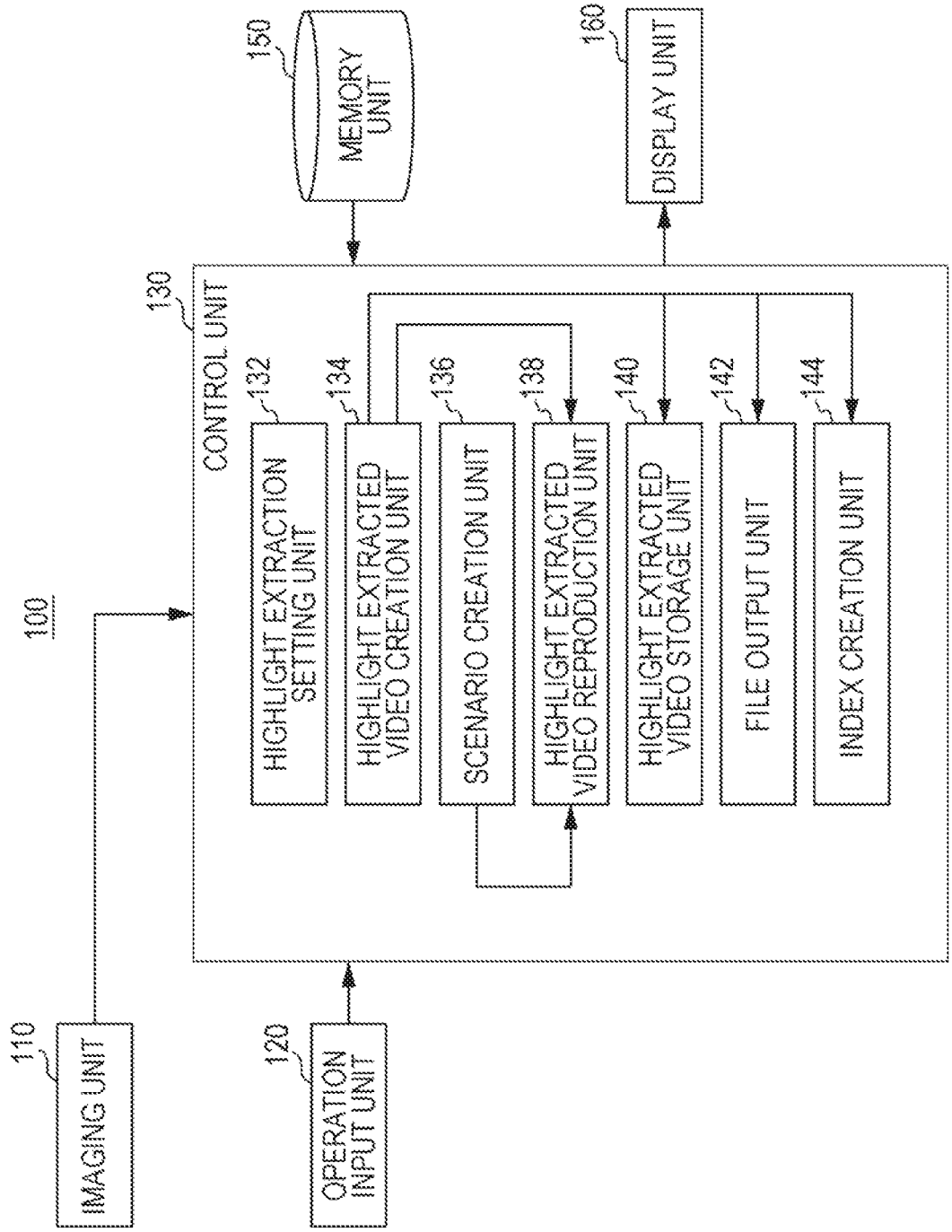
FIG. 2 is a block diagram showing a configuration example of the imaging device.

Next, a configuration of the imaging device 100 according to the embodiment is described. FIG. 2 is a block diagram showing a configuration example of the imaging device 100. As shown in FIG. 2, the imaging device 100 is configured to have an imaging unit 110, an operation input unit 120, a control unit 130, a memory unit 150, and a display unit 160.

The imaging unit 110 includes an imaging element, such as a CCD sensor and a CMOS sensor. The imaging element photoelectrically converts a subject image formed on the imaging surface by an imaging optical system (not shown). The imaging unit 110 A/D converts a video signal obtained by photoelectric conversion to output it as video data to the control unit 130.

The operation input unit 120 is an operational member, such as a button and a switch, operated by a user. The user can carry out a desired operation by operating the operation input unit 120 while referring to a display on the display unit 160. As one example, a user can carry out an operation of pressing down a button by pointing a cursor at a position of a button displayed on the display unit 160 and pressing the operation input unit 120. In a case that the display unit 160 is provided with a touchscreen type sensor, the operation input unit 120 is equivalent to a touchscreen. In this case, a user can carry out a desired operation by operating the touchscreen while referring to a display on the display unit 160.

The memory unit 150 is, as one example, configured with a memory, such as a hard disk. To the memory unit 150, the video data is sent from the control unit 130. The memory unit 150 memorizes the video data sent from the control unit 130 and stores it therein. In the memory unit 150, a program to be executed in the control unit 130 is memorized.

The display unit 160 is configured to include a liquid crystal display and the like, and carries out a display based on video data sent from the control unit 130.

The control unit 130 is configured to have a highlight extraction setting unit 132, a highlight extracted video creation unit 134, a scenario creation unit 136, a highlight extracted video reproduction unit 138, a highlight extracted video storage unit 140, a file output unit 142, and an index creation unit 144. Each component of the control unit 130 shown in FIG. 2 can be configured with hardware (circuit) or a central processing unit (CPU), and software (program) to function it. In this case, the program can be stored in the memory unit 150.

The highlight extraction setting unit 132 carries out various settings regarding the highlight extracted video based on an instruction of a user inputted to the operation input unit 120. As described later in detail, in the embodiment, as one example, it is possible to set six items of "range", "theme", "BGM", "length", "sound mixing", and "point specification" regarding the highlight video extracted file.

The highlight extracted video creation unit 134 obtains a video file stored in the memory unit 150 for every one or a plurality of events to create a highlight video of the obtained video files. Then, the highlight extracted video creation unit 134 creates one highlight extracted video from the plurality of highlight videos. When the highlight extracted video is created, the scenario creation unit 136 creates a scenario thereof. Here, a scenario is information showing how much time of a video is retrieved in the highlight extracted video from which video file.

The highlight extracted video reproduction unit 138 carries out processing to reproduce a highlight extracted video. The highlight extracted video reproduction unit 138 sends data of a highlight extracted video to the display unit 160 in a case of reproducing the highlight extracted video. With this, the highlight extracted video is reproduced in the display unit 160.

The highlight extracted video storage unit 140 carries out processing to make the highlight extracted video into one data file (highlight video extracted file) for storage. With this, the highlight extracted video is stored in the memory unit 150 as one data file.

The file output unit 142 outputs the one data file created by the highlight extracted video storage unit 140 to upload it on the web or to create a DVD. The index creation unit 144 creates an index of a highlight video extracted file created in the past. The created index is displayed on the display unit 160. By selecting a desired file from the index displayed on the display unit 160, a user can reproduce a desired video file and also upload it on the web and create a DVD.

3. Specific Processing in Imaging Device

Figure 3:
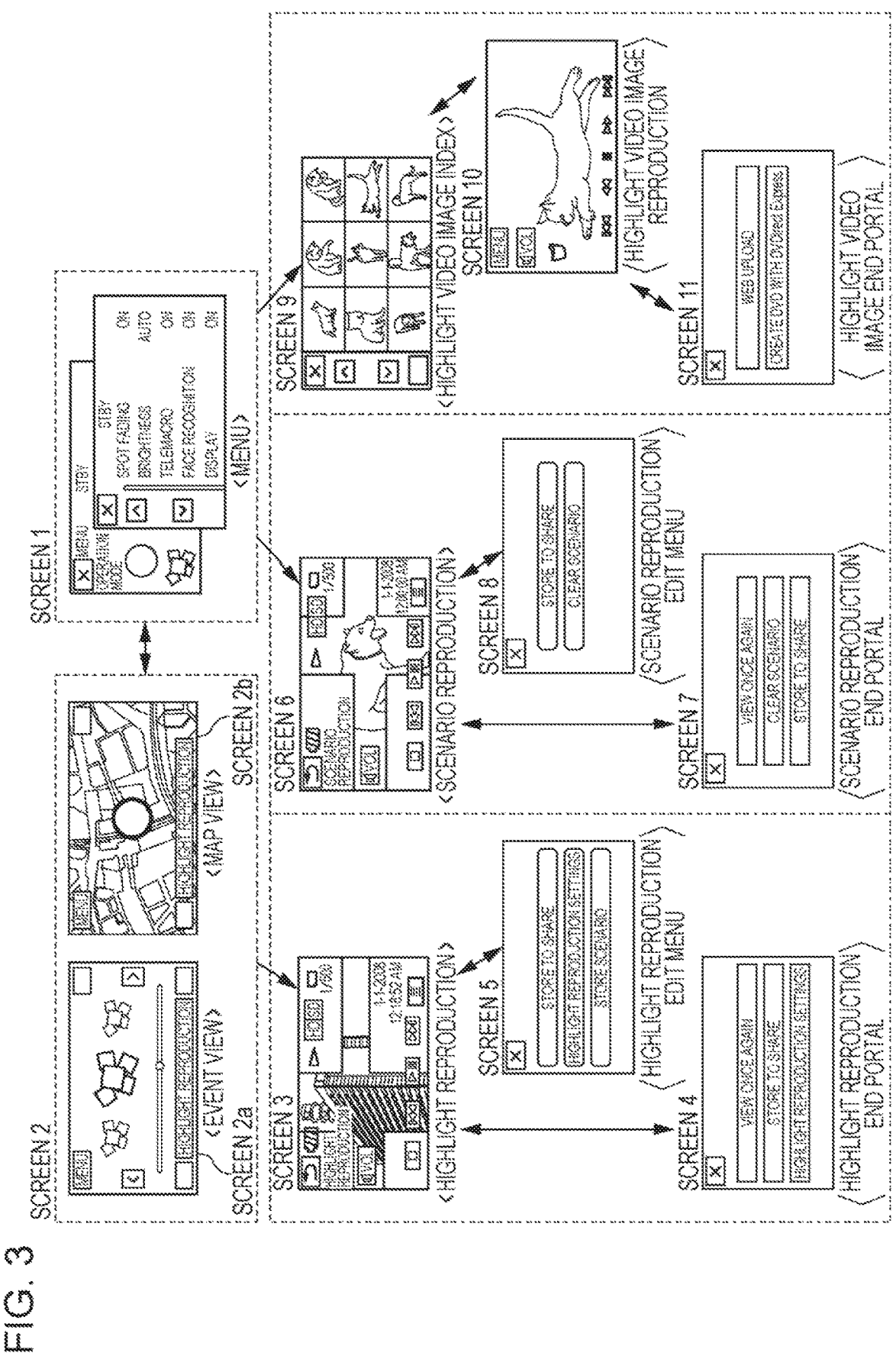
FIG. 3 is a block diagram illustrating a process flow to create a highlight video extracted file based on display contents on a display unit.
Figure 4:
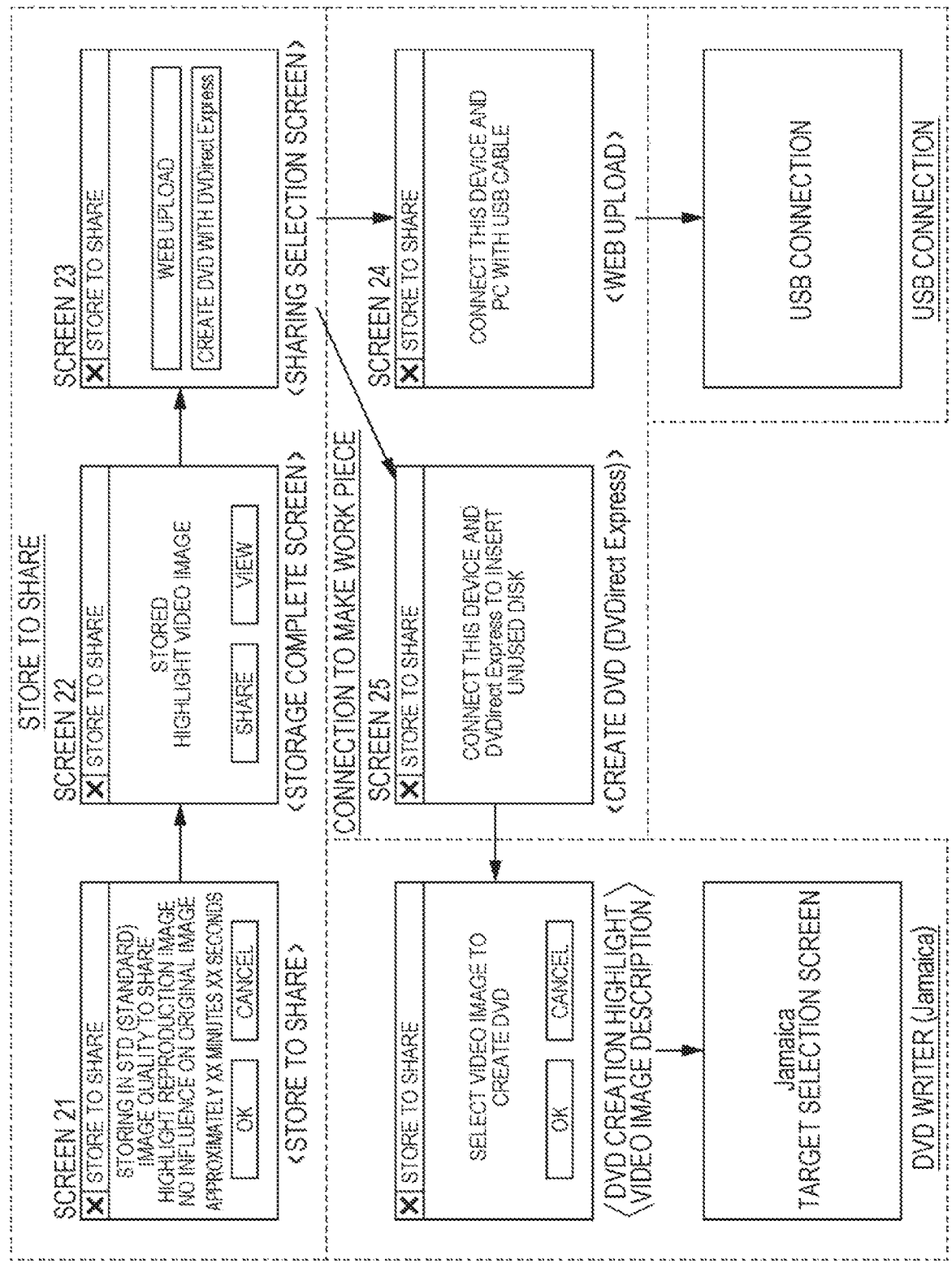
FIG. 4 is a block diagram illustrating a process flow to create a highlight video extracted file based on display contents on the display unit.

FIGS. 3 and 4 are block diagrams illustrating process flows to create a highlight video extracted file based on display contents of the display unit 160. In the embodiment, a video file can be created from "an event view (screen 2a)" or "a map view (screen 2b)". In the "event view", a plurality of video files is recorded for every event, and one highlight video extracted file can be created from the plurality of video files. For example, in a case of a travel event, a video filmed on the train before reaching the destination, a video filmed at the destination, and the like are recorded as a plurality of video files, and it is possible to create one highlight video extracted file from these video files. In a case that a user specifies a plurality of events, it is possible to create one highlight video extracted file from videos of the plurality of events.

In a case of the "map view", when a plurality of video files filmed near a certain spot A is recorded, it is possible to create one highlight video extracted file from the plurality of video files by specifying the spot A. In a case that a user specifies a plurality of spots, it is possible to create one highlight video extracted file from a plurality of videos filmed near the plurality of spots.

When creating the highlight video extracted file, firstly, a highlight extracted video is reproduced. Then, in a case that the user likes the highlight extracted video and would like to create a highlight video extracted file, it is possible to create a highlight video extracted file by carrying out processing for that.

As shown in FIG. 3, a user can have either the "event view" or the "map view" displayed (screens 2) from a menu screen (screen 1) to specify either view that creates a highlight video extracted file. Then, after specifying the "event view" or the "map view", he/she browses on a browser screen and selects video files to create a highlight image.

In a case of the "event view", one or a plurality of events to create a highlight video extracted file is selected. In addition, in a case of the "map view", one or a plurality of spots to create the highlight video extracted file is selected. Then, by pressing a highlight reproduction button, the highlight extracted video is created and highlight reproduction is carried out (screen 3).

During reproduction or after reproduction of the highlight extracted video, a user can press any button of "view once again", "store to share", "highlight reproduction settings", and "store scenario" to carry out these processes (screen 4, screen 5). For example, in a case of pressing the "view once again" button after reproducing the highlight extracted video, it is possible to view the highlight extracted video once again. In a case of pressing the "store to share" button, the highlight extracted video can be stored as one highlight video extracted file to move onto a process of uploading it on the web or creating a DVD so as to allow a plurality of users to share it. These processes are described later in detail. In a case of pressing the "store scenario" button, the highlight video extracted file itself is not stored but a scenario of the highlight extracted video is stored.

A user can carry out a scenario reproduction process based on an already stored scenario. In this case, a user enters a scenario reproduction screen (screen 6) from the menu (screen 1) and presses a "scenario reproduction" button. With this, a highlight extracted video is created from the scenario to carry out reproduction. After reproduction, by pressing any of the "view once again", "clear scenario", and "store to share" buttons (screen 7, screen 8), it is possible to go on to a subsequent process.

A user can specify a highlight video extracted file created in the past and stored in the memory unit 150 for reproduction. In this case, a user has a highlight video image catalog (index) displayed (screen 9) from the menu screen (screen 1) to specify a desired highlight video extracted file that is stored. With this, a user can reproduce a highlight video extracted file created in the past (screen 10), and then by selecting a function of execution, he/she can upload it on the web or create a DVD to share it (screen 11).

FIG. 4 is a block diagram illustrating processes of storing a highlight video extracted file to share in a case that the "store to share" button is pressed in the screens 4, 5, 7, and 8 shown in FIG. 3. As a user presses the "store to share" button, a screen 21 shown in FIG. 4 is displayed, and further as selecting an "OK" button, the reproduced highlight extracted video is stored in the memory unit 150 as one highlight video extracted file. This enables a highlight video extracted file to be stored as one file of work piece.

After storing the highlight video extracted file, the screen 22 is displayed, and as a user selects "share", a screen (screen 23) to select whether to upload it on the web or to create a DVD. In a case that a user selects "web upload" on the screen 23, a message of connecting the imaging device 100 and a personal computer with a USB cable is displayed (screen 24). A user can connect the imaging device 100 to a personal computer to upload the highlight video extracted file on the web.

In a case that the imaging device 100 has a function to connect to a network, such as the Internet, the imaging device 100 does not have to be connected to a personal computer, and it is possible to directly upload from the imaging device 100 on the web.

In a case that a user selects "create DVD" on the screen 23, a message of connecting the imaging device 100 and a DVD recording device is displayed (screen 25). A user can connect the imaging device 100 to a DVD recording device to record a highlight video extracted file on a DVD. In a case that the imaging device 100 is provided with a DVD recording device, a highlight reproduction video can be recorded directly on a DVD.

Figure 5:
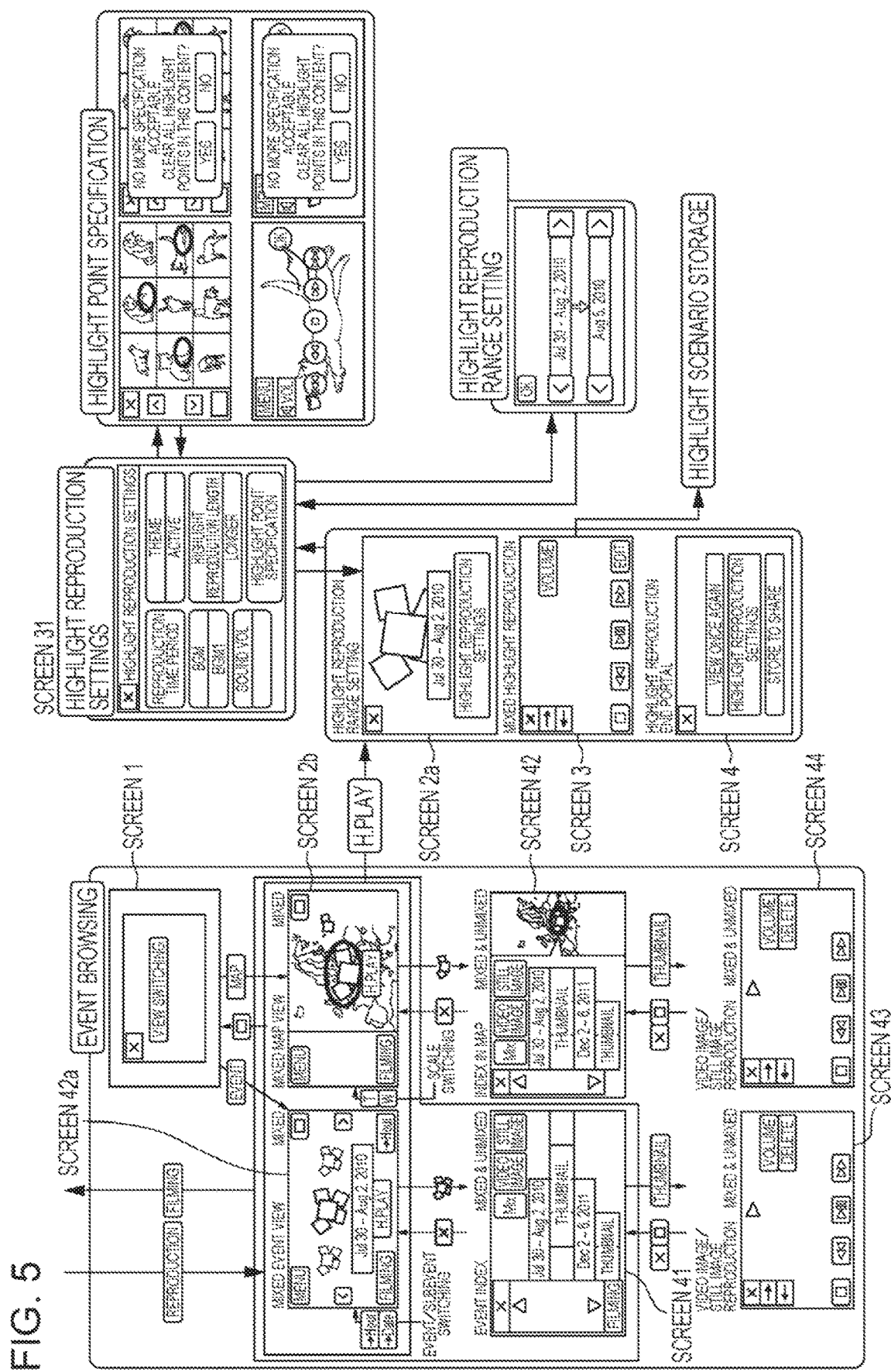
FIG. 5 is a block diagram illustrating a highlight reproduction setting process.

Next, based on FIG. 5, a highlight reproduction setting process is described. A screen 2a shown in FIG. 5 illustrates an event view similar to the screen 2a in FIG. 3. A user can carry out various settings on a highlight extracted video by moving onto a screen (screen 31) of highlight reproduction settings to operate the screen 31. Here, as user configurable items, six items of "range", "theme", "BGM", "length", "sound mixing", and "point specification" are shown as an example. The "range" is an item to set a number of event(s) (in a case of the event view) or a number of date(s) (in a case of the map view) to create a highlight extracted video. A user can set whether to create a highlight extracted video from a video of one event (or date) or to create a highlight extracted video from two or more events (or dates).

The "theme" is an item to set an effect of an image. As one example, a user can select a desired item from the items, such as "active", "stylish", and "simple", for setting. The "BGM" is an item to set a music played in the background. A user can set a desired tune as the "BGM". The "length" is an item to set a temporal length of a highlight extracted video. Here, as one example, the temporal length of a highlight extracted video is supposed to be adjustable to lengths in four stages. The "sound mixing" is an item to determine a ratio of volumes of the BGM and an actual sound. The "point specification" is an item to set a position of a highlight video in an original video file.

Similar to FIG. 3, by instructing highlight reproduction from the screen 2a, a highlight extracted video is created and reproduced (screen 3). On the screen 3, by selecting "edit" while reproducing a highlight extracted video, a scenario of the highlight extracted video can be stored. As described above, a scenario is information showing how much time of a highlight video is retrieved from which video file to the highlight extracted video. In such a manner, by storing a scenario, when selecting a stored scenario, a highlight extracted video can be reproduced based on the scenario.

As the highlight reproduction is finished, as described in FIG. 3, a screen to select "view once again", "highlight reproduction settings", and "store to share" is displayed (screen 4). In a case of carrying out highlight reproduction settings again, settings can be carried out again by selecting "highlight reproduction settings".

From each screen of event browsing shown in FIG. 5, regarding each of the event view (screen 2a) and the map view (screen 2b), a user can have an index displayed (screens 41, 42) and reproduce each video file normally (screens 43, 44).

4. Process Flow by Imaging Device

FIG. 6 is a flowchart showing a process procedure by the imaging device 100. Firstly, in step S100, a user specifies an event view or a map view to instruct highlight reproduction, thereby creating a highlight extracted video to be reproduced. Next, in step S104, it is determined whether or not to store the highlight extracted video as one highlight video extracted file. In step S104, in response to an operation of a user, it is determined whether or not to store the highlight video extracted file. It is also possible to store a scenario of the highlight extracted video after step S100.

In a case of storing the highlight video extracted file in step S104, the procedure goes on to step S106. In contrast, in a case of not storing the highlight video extracted file in step S104, the process is finished. In step S106, the reproduced highlight extracted video is stored as one highlight video extracted file. In step S108 that follows, it is determined whether or not to share the highlight video extracted file. In step S108, in response to an operation of a user, it is determined whether or not to share a highlight video extracted file.

In a case of sharing the highlight video extracted file in step S108, the procedure goes on to step S110. In contrast, in a case of not sharing the highlight video extracted file, the process is finished. In a case of going on to step S110, in response to an instruction of a user, it is determined whether to upload the highlight video extracted file on the web or to create a DVD. In a case of uploading on the web, the procedure goes on to step S114, and after connection to a network is done, the highlight video extracted file is uploaded on the web. In contrast, in a case of creating a DVD, the procedure goes on to step S112 to create a DVD. After step S112 or S114, the process is finished (END).

In a case of sharing the highlight video extracted file selected from the highlight video image index and reproduced, the highlight video image catalog (index) is firstly displayed in step S101 and the desired highlight video extracted file that is stored is specified, and then reproduction of the highlight extracted video is carried out in step S100. In a case of storing a highlight video extracted file from scenario reproduction, after the scenario reproduction in step S102, it is determined in step S104 whether or not to store the reproduced highlight extracted video as one highlight video extracted file.

As described above, according to the embodiment, since a highlight video extracted file can be stored in one data file, it is possible to easily carry out processes, such as uploading a highlight reproduction video on the web and creating a DVD of the highlight reproduction video. It also becomes possible to select an already created highlight video extracted file to be reproduced. Further, by storing a scenario of a highlight extracted video, a highlight extracted video can be reproduced from the scenario and a highlight video extracted file can also be created after the reproduction. Accordingly, it becomes possible to significantly enhance the convenience of a highlight reproduction video.

Although a preferred embodiment of the present disclosure has been described in detail with reference to the attached drawings, embodiments of the present disclosure are not limited to such an example. It is apparent that a person with ordinary knowledge in the art of embodiments of the present disclosure can appreciate various modifications or alterations within the technical ideas according to embodiments of the present disclosure, and naturally these are understood to belong to the technical scope of embodiments of the present disclosure.

The present disclosure contains subject matter related to that disclosed in Japanese Priority Patent Application JP 2010-290445 filed in the Japan Patent Office on Dec. 27, 2010, the entire contents of which are hereby incorporated by reference.

What is claimed is:

1. An image processing device, comprising:
a highlight extracted video creation unit configured to:
extract a highlight video from each video file of a plurality of video files based on position information associated with the plurality of video files, wherein the position information corresponds to a location of recordation of the plurality of video files; and
create a highlight extracted video based on the extraction of the highlight video from each video file of the plurality of video files;
a highlight extracted video storage unit configured to store the created highlight extracted video as one data file;
a highlight extraction setting unit configured to set a ratio of a volume of music in a background of the stored highlight extracted video and a volume of an actual sound associated with the stored highlight extracted video;
a highlight extracted video reproduction unit configured to reproduce the stored highlight extracted video on a display screen, wherein the reproduction is based on the set ratio of the volume of the music in the background of the highlight extracted video and the volume of the actual sound associated with the highlight extracted video; and
a highlight extracted video file output unit configured to output the reproduced highlight extracted video to a device connectable to a network, wherein the output of the reproduced highlight extracted video is based on a user input.

2. The image processing device according to claim 1, wherein the highlight extracted video file output unit is further configured to upload the reproduced highlight extracted video via the network.

3. The image processing device according to claim 1, wherein
the highlight extracted video file output unit is further configured to output the reproduced highlight extracted video to a recording unit of a disk form recording medium, and
the recording unit records the reproduced highlight extracted video on the disk form recording medium.

4. The image processing device according to claim 1, further comprising:
a scenario creation unit configured to create a scenario of the highlight extracted video; and
a scenario storage unit configured to store the scenario.

5. The image processing device according to claim 4, wherein the scenario of the highlight extracted video corresponds to time information of each video file of the plurality of video files in the highlight extracted video.

6. The image processing device according to claim 1, further comprising an index creation unit configured to create an index of the one data file, wherein the highlight extracted video file output unit is further configured to output a user specified data file from the index.

7. An image processing method, comprising:
extracting a highlight video from each video file of a plurality of video files based on position information associated with the plurality of video files, wherein the position information corresponds to a location of recordation of the plurality of video files;

creating a highlight extracted video based on the extraction of the highlight video from each video file of the plurality of video files;
storing the created highlight extracted video as one data file;
setting a ratio of a volume of music in a background of the stored highlight extracted video and a volume of an actual sound associated with the stored highlight extracted video;
reproducing the stored highlight extracted video on a display screen, wherein the reproduction is based on the set ratio of the volume of the music in the background of the highlight extracted video and the volume of the actual sound associated with the highlight extracted video; and
outputting the reproduced highlight extracted video to a device connectable to a network, wherein the output of the reproduced highlight extracted video is based on a user input.

8. A non-transitory computer-readable medium having stored thereon computer-executable instructions that, when executed by a processor, cause the processor to perform operations, the operations comprising:
 extracting a highlight video from each video file of a plurality of video files based on position information associated with the plurality of video files, wherein the position information corresponds to a location of recordation of the plurality of video files;
creating a highlight extracted video based on the extraction of the highlight video from each video file of the plurality of video files;
storing the created highlight extracted video as one data file;
setting a ratio of a volume of music in a background of the stored highlight extracted video and a volume of an actual sound associated with the stored highlight extracted video;
reproducing the stored highlight extracted video on a display screen, wherein the reproduction is based on the set ratio of the volume of the music in the background of the highlight extracted video and the volume of the actual sound associated with the highlight extracted video; and
outputting the reproduced highlight extracted video to a device connectable to a network, wherein the output of the reproduced highlight extracted video is based on a user input.

\* \* \* \* \*